United States Patent
Fan et al.

(10) Patent No.: US 11,989,500 B2
(45) Date of Patent: May 21, 2024

(54) FRAMEWORK AGNOSTIC SUMMARIZATION OF MULTI-CHANNEL COMMUNICATION

(71) Applicant: INTUIT INC., Mountain View, CA (US)

(72) Inventors: Zhewen Fan, San Diego, CA (US); Farzaneh Khoshnevisan, San Diego, CA (US); Byungkyu Kang, San Diego, CA (US); Yingxin Wang, Newark, CA (US); Sonia Sharma, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 18/453,772

(22) Filed: Aug. 22, 2023

(65) Prior Publication Data
US 2024/0111941 A1    Apr. 4, 2024

Related U.S. Application Data (63) Continuation of application No. 17/937,086, filed on Sep. 30, 2022, now Pat. No. 11,783,112.

(51) Int. Cl.
| | | |
|---|---|---|
| *G06F 40/106* | (2020.01) | |
| *G06F 16/34* | (2019.01) | |
| *G06F 40/205* | (2020.01) | |

(52) U.S. Cl.
CPC .......... *G06F 40/106* (2020.01); *G06F 16/345* (2019.01); *G06F 40/205* (2020.01)

(58) Field of Classification Search
None
See application file for complete search history.

(56) References Cited

U.S. PATENT DOCUMENTS

| | | | |
|---|---|---|---|
| 11,170,154 B1 | 11/2021 | Van Dyke et al. | |
| 11,226,720 B1 * | 1/2022 | Vandivere | G06N 3/044 |
| 2017/0300565 A1 | 10/2017 | Calapodescu et al. | |

(Continued)

OTHER PUBLICATIONS

H. Yu, G. Zhang and Y. Shen, "Hidden Markov-based LDA Internet Sensitive Information Text Filtering," 2020 IEEE 11th International Conference on Software Engineering and Service Science (ICSESS), Beijing, China, 2020, pp. 1-6. (Year: 2020).*

(Continued)

*Primary Examiner* — Amelia L Tapp
(74) *Attorney, Agent, or Firm* — Patterson + Sheridan, LLP (57) ABSTRACT

Aspects of the present disclosure provide techniques for improved automated parsing and display of electronic documents. Embodiments include identifying a set of topics in a first electronic document based on one or more rules related to one or more keywords in the first electronic document. Embodiments include providing one or more inputs to a machine learning model based on the set of topics and a second electronic document related to the first electronic document. Embodiments include receiving, from the machine learning model in response to the one or more inputs, one or more outputs related to formatting the second electronic document for display. Embodiments include generating a formatted version of the first electronic document based on the set of topics and generating a formatted version of the second electronic document based on the one or more outputs.

20 Claims, 7 Drawing Sheets

(56) References Cited

U.S. PATENT DOCUMENTS

| | | |
|---|---|---|
| 2019/0028520 A1 | 1/2019 | Nawrocki |
| 2021/0117621 A1 | 4/2021 | Sharpe et al. |
| 2022/0067284 A1 | 3/2022 | He et al. |
| 2022/0188885 A1* | 6/2022 | Blackman .............. G06F 16/182 |
| 2023/0080686 A1* | 3/2023 | Gupta ................. G06F 16/3347 726/26 |

OTHER PUBLICATIONS

Sonone et al., "Multi-Modal Topic Modelling and summarization with Dense block Detection: a Review" 217 International Conference on Recent Trends in Electrical, Electronics and Computing Technologies, copyright 2017 IEEE, pp. 177-182. (Year: 2017).

* cited by examiner

ORIGINAL CALL 510

...
"Okay"
"Yeah I'm going to upload a couple of files and then oh yeah I've got most of the documents and I believe I've got a good list going here."
"Right"
"Um but if you take the standard deduction, you can tale a charitable deduction of up to $300"
"Well that could make sense this year."
"You probably took um a standard deduction or did you itemize because you were over the standard with charitable giving and things like that."
"Uh let's see what it did on my, let's see what itemized deductions."
"So once you file this season they're gonna ask if you received any of the CTC payments. I think we're supposed to get 1800 for dependents."
"Tax return is ready for client review. Awesome job, thanks for great work and good notes."
...

FORMATTED CALL 520

DEDUCTIONS ::
Expert: Um but if you take the *standard deduction*, you can tale a *charitable deduction* of up to $300.
Customer: Well that could make sense this year.
Customer: You probably took um a *standard deduction* or did you itemize because you were over the standard with charitable giving and things like that.

CREDITS ::
Expert: So once you file this season they're gonna ask if you received any of the *CTC payments*. I think we're supposed to get 1800 for dependents.

ESTIMATED PAYMENTS/WITHHOLDING ::
Customer: Uh let's see what it did on my, let's see what *itemized deductions*.
Expert: So once you file this season they're gonna ask if you received any of the *CTC payments*. I think we're supposed to get 1800 for dependents.

NON TAX ISSUE :: Tax return is ready for client review. Awesome job, thanks for great work and good notes.

FRAMEWORK AGNOSTIC SUMMARIZATION OF MULTI-CHANNEL COMMUNICATION

CROSS-REFERENCE TO RELATED APPLICATIONS

This application is a continuation of co-pending U.S. patent application Ser. No. 17/937,086, filed Sep. 30, 2022, the contents of which are incorporated herein by reference in their entirety.

INTRODUCTION

Aspects of the present disclosure relate to techniques for improved analysis and automated reformatting of documents for optimized display.

BACKGROUND

Every year millions of people, businesses, and organizations around the world utilize software applications to assist with countless aspects of life. Text content is frequently input and processed by software applications for a variety of purposes, such as maintaining records of interactions between users and experts related to software applications for subsequent analysis. In some cases text data is stored in a variety of different formats, and may be unstructured and/or lacking metadata.

Unstructured text may be dense and disorganized, and reviewing such text in a variety of different formats within a software application may be tedious and inefficient. For example, displaying unstructured text in multiple formats within a user interface may result in poor usability, suboptimal utilization of screen space, loss of time, and poor user satisfaction.

As such, there is a need in the art for improved techniques of automated analysis and optimized display of documents within software applications.

BRIEF SUMMARY

Certain embodiments provide a method for automated parsing and display of electronic documents. The method generally includes: identifying a set of topics in a first electronic document based on one or more rules related to one or more keywords in the first electronic document; providing one or more inputs to a machine learning model based on the set of topics and a second electronic document related to the first electronic document; receiving, from the machine learning model in response to the one or more inputs, one or more outputs related to formatting the second electronic document for display; generating a formatted version of the first electronic document based on the set of topics; generating a formatted version of the second electronic document based on the one or more outputs; and displaying the formatted version of the first electronic document and the formatted version of second electronic document via a user interface.

Other embodiments provide a method for automated parsing and display of electronic documents. The method generally includes: identifying a plurality of hierarchical topics in a first plurality of electronic documents based on one or more rules related to one or more keywords in the first plurality of electronic documents; providing one or more inputs to a machine learning model based on the plurality of hierarchical topics and a second electronic document related to the first plurality of electronic documents; receiving, from the machine learning model in response to the one or more inputs, one or more outputs related to formatting the second electronic document for display; generating formatted versions of the first plurality of electronic documents based on the plurality of hierarchical topics; generating a formatted version of the second electronic document based on the one or more outputs; and displaying the formatted versions of the first plurality of electronic documents and the formatted version of second electronic document via a user interface.

Other embodiments provide a system comprising one or more processors and a non-transitory computer-readable medium comprising instructions that, when executed by the one or more processors, cause the system to perform a method. The method generally includes: identifying a set of topics in a first electronic document based on one or more rules related to one or more keywords in the first electronic document; providing one or more inputs to a machine learning model based on the set of topics and a second electronic document related to the first electronic document; receiving, from the machine learning model in response to the one or more inputs, one or more outputs related to formatting the second electronic document for display; generating a formatted version of the first electronic document based on the set of topics; generating a formatted version of the second electronic document based on the one or more outputs; and displaying the formatted version of the first electronic document and the formatted version of second electronic document via a user interface.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Aspects of the present disclosure provide apparatuses, methods, processing systems, and computer-readable mediums for automated parsing and display of electronic documents.

Embodiments described herein involve utilizing a rule-based summary model to identify topics present in a document and automatically reformat the document for optimized display based on the identified topics. Furthermore, embodiments described herein involve utilizing a highlighter model that utilizes vector analysis to identify significant portions of a document (e.g., for highlighting or emphasis) based on contents of the document and keywords associated with topics identified in a related document using the summary model. Thus, as described in more detail below with respect to FIG. 1, the summary model and highlighter model may be utilized together to reformat a plurality of related documents for optimized display, such as organized by topic and with significant words and/or phrases highlighted or otherwise emphasized, and/or with irrelevant portions removed.

In one example use case, a set of related documents reflect records of multi-channel communication between a user of a software application and a support professional, such as an expert. Multi-channel communication may include records of communications via a plurality of different "channels" (e.g., different communication media) such as transcripts of audio conversations, transcripts of electronic chat sessions, notes entered by support professionals, and/or the like. Some types of documents such as notes entered by support professionals, may be shorter and therefore suitable to evaluate using a rule-based summary model. For example, as described in more detail below with respect to FIG. 2, a summary model may extract topics from a note based on rules related to contents of the note. In some cases, the summary model handles notes differently based on a number of topics extracted from the notes, such as performing additional processing on notes from which two or more topics are extracted. Extracted topics may be used to automatically generate a formatted version of the note in which the contents are organized and/or otherwise formatted for optimized display by topic. In some embodiments, portions of a note (or other document) that are not determined by the summary model to contain any topic (e.g., of the topics known to the summary model) may be excluded from the formatted version of the note generated according to techniques described herein.

Other types of documents such as transcripts of voice or text conversations may not be well suited for processing directly by the rule-based summary model, such as due to these types of documents having a large amount of content that would require a significant amount of computing resources to process according to an entire set of rules and/or due to these types of documents having irregular language (e.g., generated via speech to text techniques and/or input during a chat session in imprecise language) that may not directly match that indicated in rules. Thus, for documents of these types, as described in more detail below with respect to FIG. 3, topics may be extracted from related documents (e.g., notes) using the summary model and then the extracted topics may be used as inputs to a highlighter model along with the documents for use in automatically generating formatted versions of the documents. The highlighter model may compare vector representations of text in a document to corresponding vector representations of keywords associated with the extracted topics, such as using cosine similarity, to determine portions of the document that relate to the extracted topics. Thus, a formatted version of the document may be automatically generated in which certain text is highlighted, emphasized, and/or otherwise formatted for optimized display to indicate its relation to certain topics. In some embodiments, portions of a document that are not determined by the highlighter model to contain any topic (e.g., of the topics known to the highlighter model) may be excluded from the formatted version of the document that is generated.

Techniques described herein improve the technical field of automated document analysis and display in a number of ways. For instance, by utilizing a summary model to automatically extract topics that are present in certain types of documents regardless of document format or framework, embodiments of the present disclosure solve the technical problem of automatically determining contents of unstructured documents and allow formatted versions of the documents (e.g., structured by topic) to be automatically generated for optimized display via computing devices. Furthermore, by utilizing a combination of a summary model and a highlighter model to determine topics present in certain types of documents, also regardless of document format or framework, techniques described herein allow topics to be extracted from documents for automatically generating formatted versions of the documents for optimized display even if the documents are lengthy and/or include irregular language that is difficult to analyze via rules-based models. Thus, techniques described herein improve the ability of a computer to automatically extract topics from various types of documents, particularly in the context of multi-channel communications where different types of documents are related to one another, and result in the creation of versions of documents that are automatically formatted for optimized display via computing devices. Additionally, by filtering out irrelevant content from documents when generating formatted versions of the documents based on machine learning, embodiments of the present disclosure may reduce the amount of content displayed and therefore allow for more efficient use of screen space on computing devices, particularly for devices with smaller screens such as mobile devices.

Automated Parsing and Display of Electronic Documents

Figure 1:
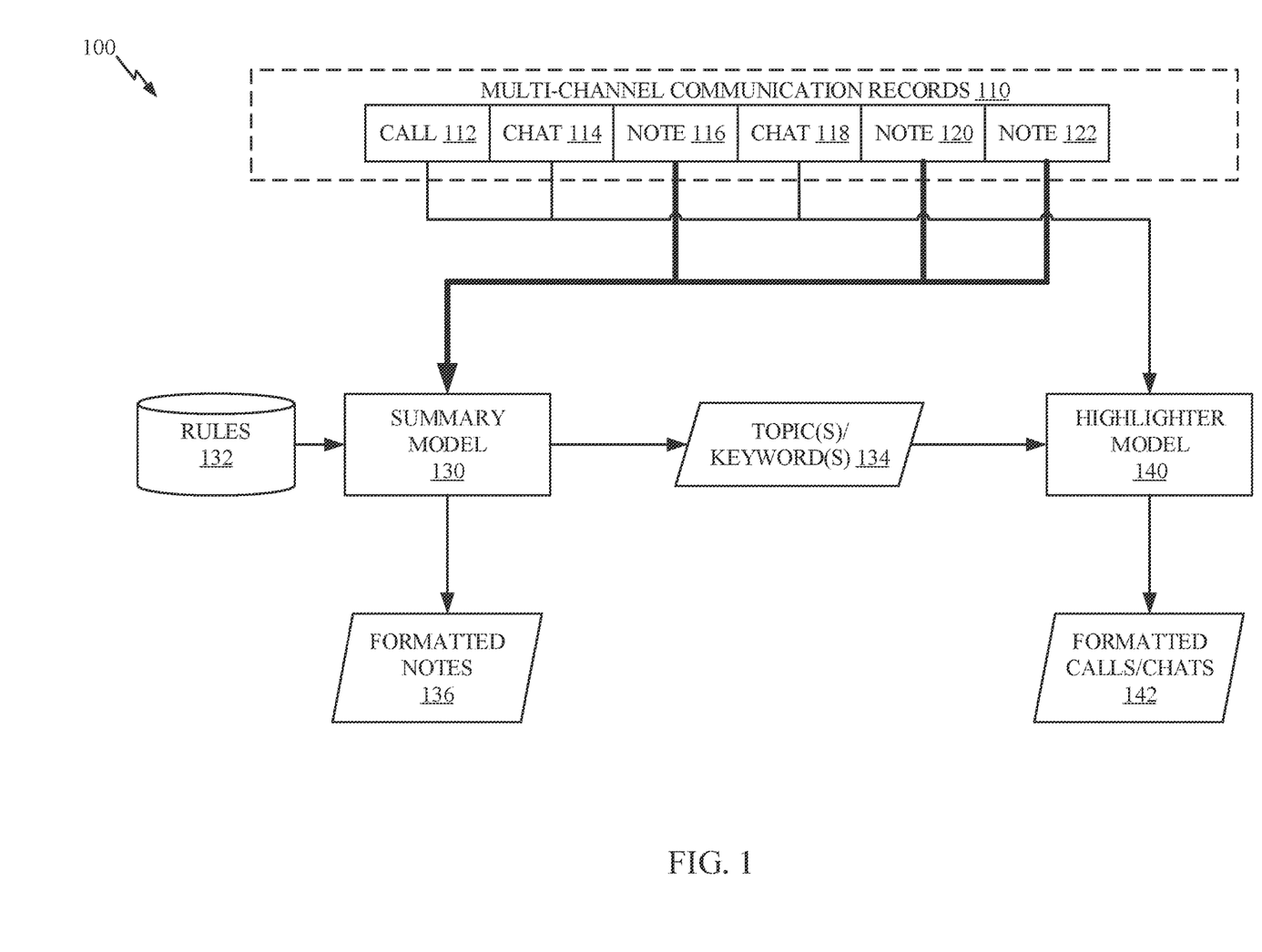
FIG. 1 is a diagram illustrating an example related to automated parsing and display of electronic documents.

FIG. 1 is an illustration 100 of an example related to automated parsing and display of electronic documents.

Multi-channel communication records 110 comprise a plurality of a documents that are related to one another and are associated with a multi-channel communication session. For example, multi-channel communication records 110 may relate to interactions between a user of a software application and one or more experts related to one or more subjects such as preparation of a tax return. Multi-channel communication records 110 include a transcript of a call 112, a transcript of a chat 114 (e.g., a text-based conversation), a note 116 (e.g., entered by an expert) another transcript of a chat 118, and two more notes 120 and 122.

A summary model 130 comprises a rules-based model that extracts topics from documents based on or more rules 132 and is used to automatically generate formatted versions of the documents, based on the extracted topics, for optimized display. Operation of summary model 130 is described in more detail below with respect to FIGS. 2 and 4.

A highlighter model 140 comprises a machine learning model that identifies portions of documents that relate to particular topics that have been extracted from related documents (e.g., using summary model 130), and is used to automatically generate formatted versions of the documents, based on the identified portions, for optimized display.

Operation of highlighter model 140 is described in more detail below with respect to FIGS. 3 and 5.

Inputs are provided to summary model 130 based on notes 116, 120, and 122. For example, the text of notes 116, 120, and 122 may be provided as inputs to summary model 130. Summary model utilizes rules 132 to analyze the text of notes 116, 120, and 122, such as determining whether certain keywords are present and/or absent from the notes, in order to determine one or more topics 134 and their associated keywords that relate to notes 116, 120, and 122. Rules 132 may be based on one or more domain-specific topic dictionaries that associate keywords with topics for one or more particular domains. A domain generally refers to a subject area, such as tax preparation. For example, in the domain of tax preparation the keyword "itemized" may be associated with the topic "deductions." Thus, rules 132 applied by summary model 130 to documents from multi-channel communication records 110 may be based on a domain-specific topic dictionary associated with a domain to which multi-channel communication records 110 relate.

Formatted notes 136 are generated based on the topics identified in notes 116, 120, and 122. For example, formatted notes 136 may be versions of notes 116, 120, and 122, that are re-formatted according to topic, such as arranging portions of the notes under headers indicating topics and/or changing other formatting parameters of the notes for optimized display according to topic. In some cases portions of notes 116, 120, and 122 that are not determined by summary model 130 to contain any topics of interest are filtered out and not included in formatted notes 136.

Inputs are provided to highlighter model 140 based on the transcripts of call 112 and chats 114 and 118, as well as based on the topics 134 and associated keywords identified by summary model 130. For example, because call 112 and chats 114 and 118 are related to notes 116, 120, and 122, belonging to the same set of multi-channel communication records 110, it can be assumed that the topics in the notes are likely to be similar to the topics in the transcripts of calls and chats. Thus, in order to reduce the amount of computing resources and time required to identify topics in the transcripts of call 112 and chats 114 and 118, highlighter model 140 may limit its analysis of the transcripts of call 112 and chats 114 and 118 to looking for text similar to the keywords associated with topics 134, rather than all possible keywords associated with all possible topics (e.g., all of which may be indicated in rules 132). Furthermore, rather than searching only for text in the transcripts of call 112 and chats 114 and 118 that directly matches the keywords, highlighter model 140 compares vector representations (e.g., embeddings) of the keywords with vector representations of the text in the transcripts of call 112 and chats 114 and 118, such as using cosine similarity, to determine whether portions of the text relate to any of topics 134. Performing such an analysis for all possible keywords relating to all possible topics indicated in rules 132 may require a prohibitively large amount of computing resources and/or time, but performing such an analysis limited to keywords associated with topics 134 that were extracted from related notes 116, 120, and 122 using summary model 130 may require a substantially smaller amount of computing resources and/or time, and thus may practically be performed.

Formatted calls/chats 142 are automatically generated based on the portions of the transcripts of call 112 and chats 114 and 118 that are determined by highlighter model to relate to particular topics. For example, formatted calls/chats 142 may include portions of text that are highlighted, emphasized, or otherwise formatted in such a manner as to indicate relation to particular topics. In some cases, contents of formatted calls/chats 142 are organized under topic headers. In some embodiments, portions of call 112 and chats 114 and 118 that are not determined by highlighter model 140 to contain any topics of interest are filtered out and not included in formatted calls/chats 142.

Formatted notes 136 and formatted calls/chats 142 may be displayed to one or more users via one or more computing devices, such as within one or more user interfaces. For example, an expert working on a case related to a particular user may be provided with formatted notes 136 and/or formatted calls/chats 142 in order to efficiently review the history of the case. While reviewing the original versions of the documents in multi-channel communication records 110 may be tedious, time-consuming, and inefficient due to the unstructured and lengthy nature of some or all of these documents, reviewing formatted notes 136 and/or formatted calls/chats 142 may be significantly more efficient. Furthermore, formatted notes 136 and/or formatted calls/chats 142 may make better use of screen space of an electronic device, such as by organizing text by topic and/or filtering out extraneous/irrelevant content. In some cases, topic headers may be "collapsed" within formatted notes 136 and/or formatted calls/chats 142 so that a viewing user can click on a user interface control (e.g., "+") to expand the topic headers and view the portions of the relevant document that relate to a given topic header, thus further optimizing the documents for display (e.g., on a mobile device with limited screen space).

It is noted that the use of summary model 130 for notes and the use of highlighter model 140 for transcripts of calls and chats based on topics identified from related notes using summary model 130 is included as an example, and other arrangements are possible. For example, summary model 130 may also be used to directly extract topics from transcripts of calls and/or chats and generated formatted versions of such transcripts (although such transcripts may in some cases be too lengthy and/or may include language that it too irregular for evaluation directly by summary model 130). Similarly, highlighter model 140 may also be used to identify portions of notes that relate to certain topics and to produce formatted version of the notes (although this may be redundant in cases where notes can be successfully analyzed by summary model 130). In some embodiments a combination of summary model 130 and highlighter model 140 is used for notes as well as for transcripts of calls and/or chats. Furthermore, techniques described herein may be used to generate formatted versions of types of documents other than notes or transcripts of calls and chats, such as emails, slideshows, spreadsheets, word processing documents, images of documents (e.g., from which text is extracted using optical character recognition (OCR) or other automated text extraction techniques), and/or the like.

The terms "summary model" and "highlighter model" are not to be construed as limiting with respect to the types of formatting that may be performed with respect to each model. For example, the summary model may be used to highlight or perform other types of formatting (e.g., based on topics identified in a document) alternatively or in addition to summarizing contents of the document by topic, and the highlighter model may be used to summarize and/or otherwise organize contents of a document by topic alternatively or in addition to highlighting or using other types of formatting.

Figure 2:
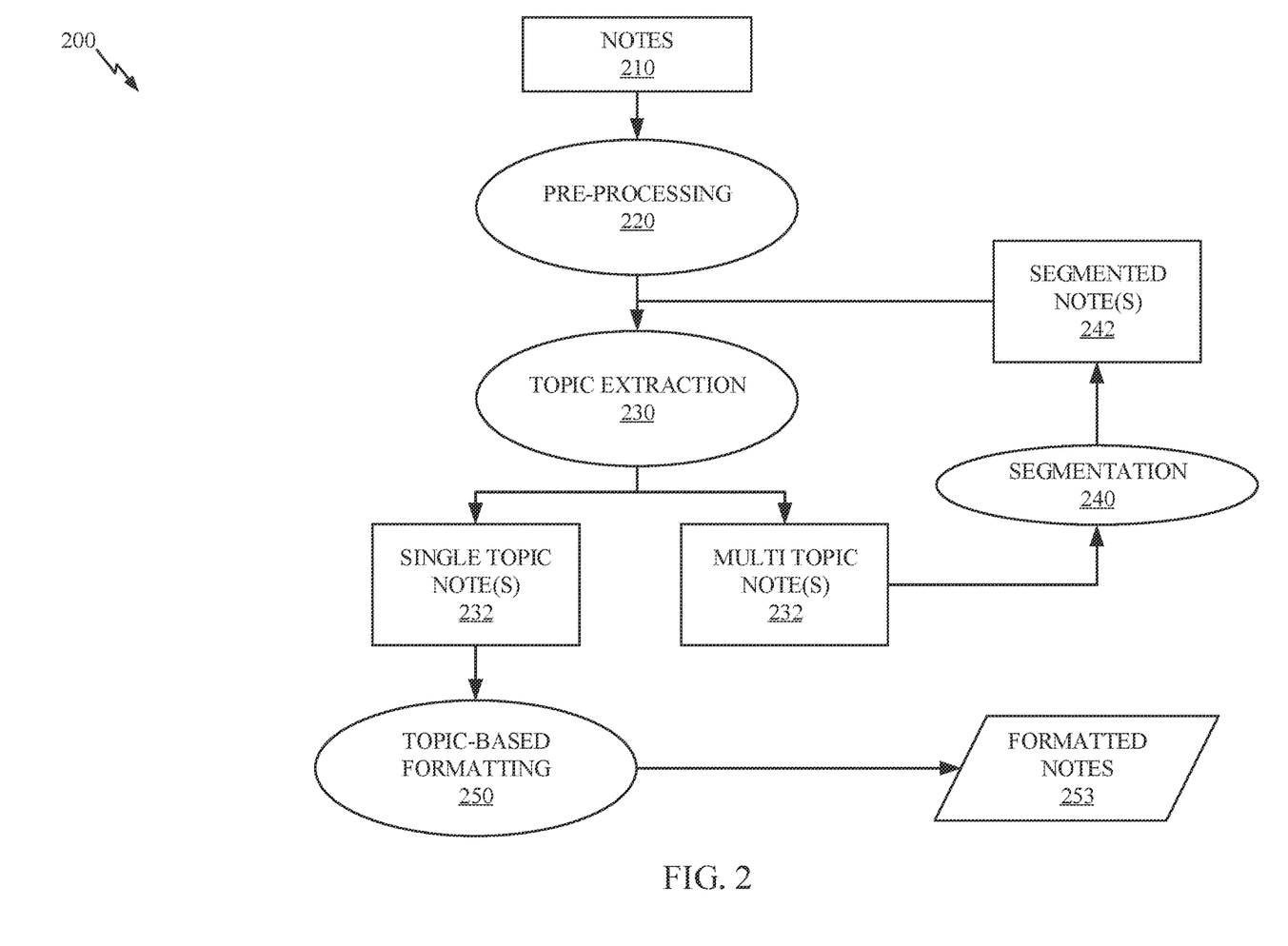
FIG. 2 depicts an example architecture of a summary model according to embodiments of the present disclosure.

FIG. 2 depicts an example architecture 200 of a summary model, such as summary model 130 of FIG. 1, according to embodiments of the present disclosure.

Notes 210 generally represent notes that are part of a multi-channel communication between a user and an expert. For example, notes 210 may represent notes 116, 120, and 122 of FIG. 1.

At pre-processing 220, notes 210 are pre-processed before topic extraction, such as removing redundant text, "stop" words (e.g., words such as "the" that are not considered relevant to any particular topic), and/or the like. At topic extraction 230, topics are extracted from notes 210 (e.g., the pre-processed notes) based on rules. A rule may, for example, state that if a note includes one particular keyword (e.g., insurance) and does not include a different particular keyword (e.g., mortgage), that the note relates to a particular topic (e.g., health insurance). Rules may relate to the inclusion/exclusion of particular keywords, the ordering of particular keywords (e.g., a first word appears before a second word), and/or the like.

In some embodiments, the summary model handles notes from which only a single topic is extracted differently than notes from which more than one topic is extracted. For example, multi-topic note(s) 232 may proceed to segmentation 240 in which such notes are broken into separate segments (e.g., corresponding to individual sentences in the notes), producing segmented note(s) 242, which are then processed again individually at topic extraction 230. Single-topic note(s) 232 may proceed directly to topic-based formatting 250, where formatted versions of such notes are generated in which contents of the notes are structured and/or otherwise formatted by topic, producing formatted notes 253.

In some cases after a multi-topic note has been segmented and one or more topics have been extracted from each segment, the topics and segments then proceed to topic-based formatting 250 to produce a formatted note 253 regardless of whether each segment includes only a single topic. In other embodiments, multi-topic segments may be further segmented, such as until each segment contains only one topic or fewer than a threshold number of topics.

As described in more detail below with respect to FIG. 4, formatted notes 253 may include topic headers corresponding to extracted topics, and notes and/or segments of notes that relate to a given topic header may be included beneath the topic header. Furthermore, in some embodiments, keywords and/or other portions of notes 210 that relate to a given topic may be highlighted, emphasized, and/or otherwise formatted in such a manner as to indicate significance of such keywords and/or portions in the text beneath a header indicating the given topic in formatted notes 253. Formatted notes 253 may exclude portions of notes 210 that are not determined to contain any relevant topics. These formatting changes are included as examples, and other types of formatting may be used to indicate topical significance of text within notes and other documents.

Figure 3:
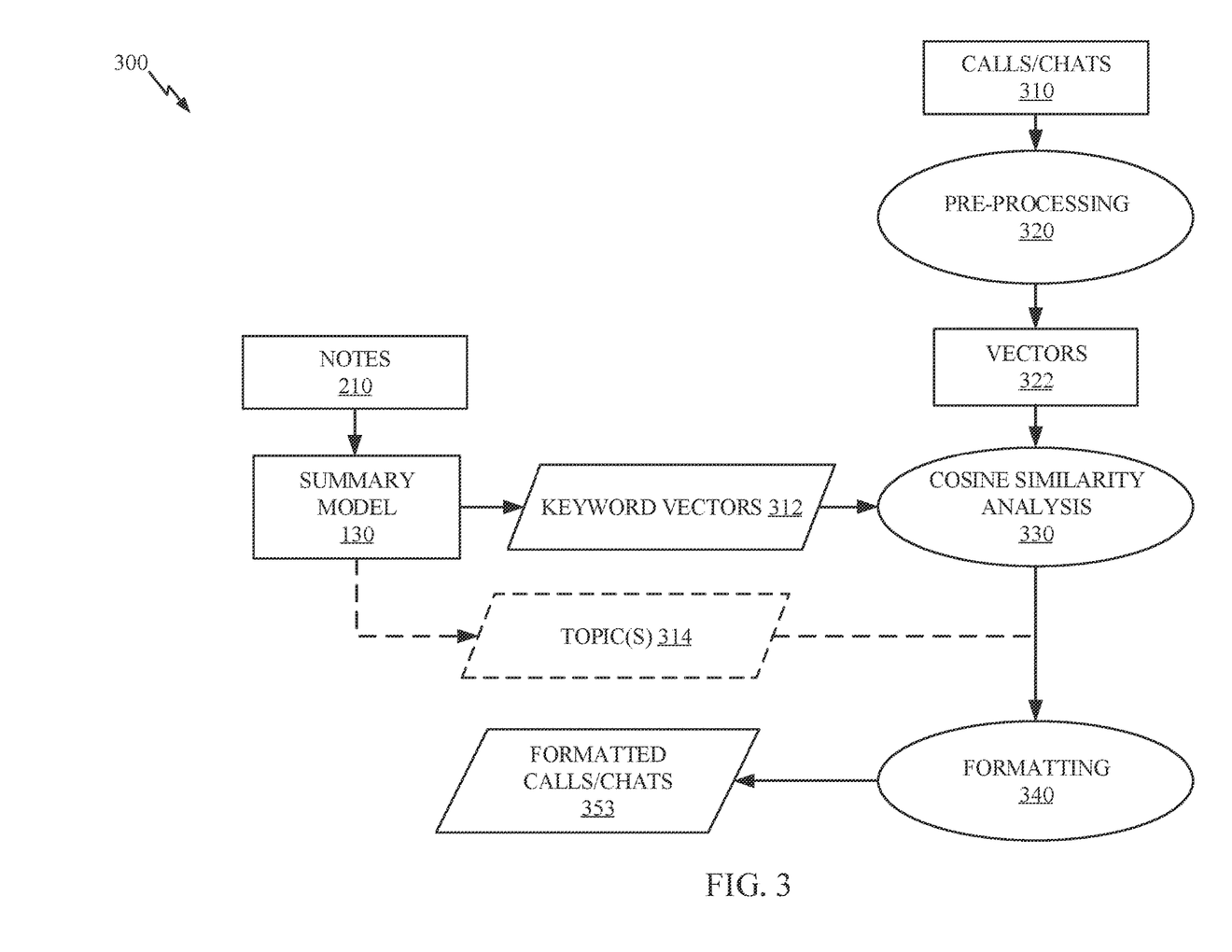
FIG. 3 depicts an example architecture of a highlighter model according to embodiments of the present disclosure.

FIG. 3 depicts an example architecture 300 of a highlighter model, such as highlighter model 140 of FIG. 1, according to embodiments of the present disclosure. FIG. 3 includes summary model 130 of FIG. 1 and notes 210 of FIG. 2.

Calls/chats 310 generally represent transcripts of audio and/or text conversations that are part of a multi-channel communication between a user and an expert. For example, calls/chats 310 may represent call 112 and chats 114 and 118 of FIG. 1.

At pre-processing 320, calls/chats 310 are pre-processed before topic extraction, such as removing redundant text, stop words, and/or the like. Furthermore, pre-processing 320 may include generating vectors 322 that represent contents of calls/chats 310. For example, one or more embedding models may be used to generate embeddings of words and/or sentences in calls/chats 310. For example, Word2Vec and/or GloVe techniques may be used. In one example, one or more bi-directional long short term memory (LSTM) models may be used. Some embodiments involve the use of a Bidirectional Encoder Representations from Transformers (BERT) or sentence BERT (sBERT) model. Vectors 322 generally comprise representations of words and/or sentences of calls/chats 310 as vectors in n-dimensional space where words and/or sentences with similar meanings are close to one another in n-dimensional space. In one example, vectors 322 are term frequency—inverse document frequency (TF-IDF) vectors.

At cosine similarity analysis 330, vectors 322 are compared to keyword vectors 312, which are vector representations (e.g., embeddings) of keywords associated with topics extracted from notes 210 (which are related to calls/chats 310) using summary model 130. For example, each keyword vector 312 may represent a given keyword associated with a topic as a vector in n-dimensional space. Keyword vectors 312 may be generated in a similar manner to vectors 322. For example, keyword vectors 312 may be TF-IDF vectors. In some embodiments keyword vectors 312 only include keywords that were specifically identified by summary model 130 in notes 210 while in other embodiments keyword vectors 312 include all known keywords associated with topics 314 identified by summary model 130 in notes 210.

Cosine similarity analysis 330 may involve determining the cosine similarity between each vector 322 and each keyword vector 312 in order to determine which portions of calls/chats 310 relate to particular topics associated with the keywords. For example, if a cosine similarity between a given vector 322 and a given keyword vector 312 exceeds (or falls below) a threshold, then the portion of the corresponding call or chat represented by the given vector 322 may be determined to relate to the topic associated with the keyword represented by keyword vector 312. Cosine similarity is included as an example, and other types of similarity measures may also be used.

At formatting 340, formatted calls/chats 353 are automatically generated based on cosine similarity analysis 330 and, in some embodiments, topic(s) 314 identified by summary model 130 in related notes 210. For example, formatted calls/chats may include highlighting, emphasis, structuring, headers, and/or other types of formatting indicating that certain portions (e.g., words, sentences, utterances, paragraphs, and/or the like) of the calls/chats relate to particular topics 314. As described in more detail below with respect to FIG. 5, formatted calls/chats 353 may include topic headers corresponding to identified topics, and portions of calls/chats that relate to a given topic header may be included beneath the topic header. Furthermore, in some embodiments, keywords and/or other portions of calls/chats 310 that relate to a given topic may be highlighted, emphasized, and/or otherwise formatted in such a manner as to indicate significance of such keywords and/or portions in the text beneath a header indicating the given topic in formatted calls/chats 353. Formatted calls/chats 353 may exclude portions of calls/chats 310 that are not determined to contain any relevant topics. These formatting changes are included as examples, and other types of formatting may be used to indicate topical significance of text within transcripts of calls and chats as well as other types of documents.

In some embodiments, formatted versions of documents may be generated in real-time and/or near real-time, such as while communications are occurring and/or immediately after a given communication ends. In one example, formatted versions of documents are generated as described herein at each of a plurality of milestones during a multi-channel communication sessions, such as when a case is handed off from one expert to another.

User feedback with respect to formatted documents generated according to techniques described herein may be used to update logic and/or models for improved accuracy in subsequent iterations. For example, if a user provides feedback indicating that a topic indicated in an automatically formatted document is incorrect, such as providing input indicating that the topic is incorrect and/or indicating an alternative correct topic, the user feedback may be used to remove, create, and/or modify one or more rules used by the summary model for topic extraction (e.g., adding, removing, and/or changing a keyword associated with a topic in a rule). In one embodiment, new keywords may be automatically learned over time. For example, if a given word appears in a large number of portions of documents that are determined to relate to a given topic but the given word is not previously known to be a keyword associated with the given topic, the given word may be automatically added as a keyword for the given topic via one or more rules associated with the summary model and/or as a keyword that the highlighter model compares to contents of documents via cosine similarity between vectors. Furthermore, words that are determined to be similar (e.g., based on cosine similarity between vectors) to keywords associated with a given topic may be automatically added as keywords associated with the given topic for use by the summary model and/or the highlighter model.

Examples of Automatically Formatting Documents for Optimized Display

Figure 4:
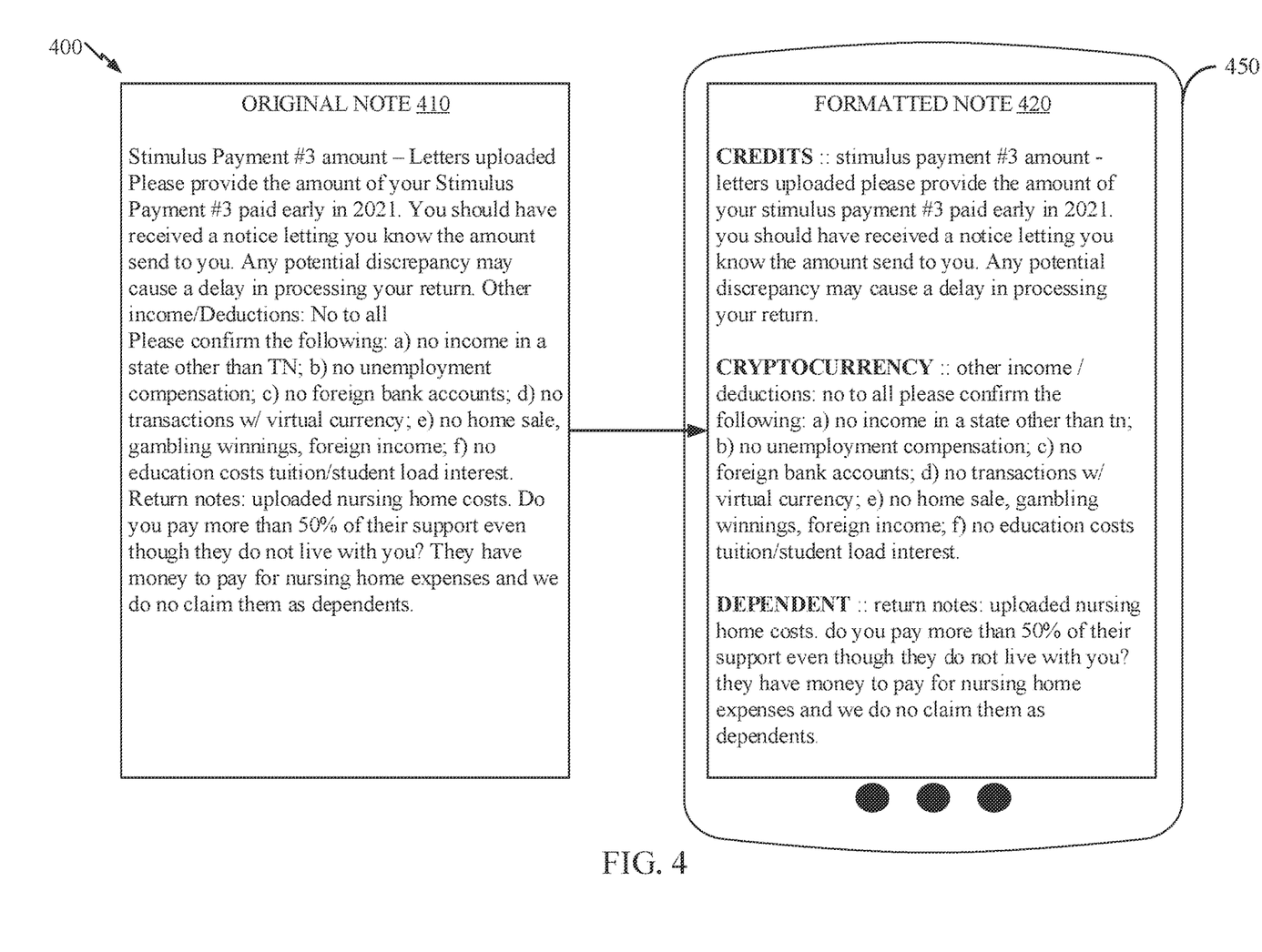
FIG. 4 depicts an example of automatic reformatting of an electronic document for optimized display within a software application.

FIG. 4 is an illustration 400 of automatic reformatting of an electronic document for optimized display within a software application. For example, illustration 400 may relate to generating a formatted note 253 based on a note 210 of FIG. 2.

Original note 410 comprises an unstructured document comprising text entered by an expert in relation to communications between the expert and a user of a software application. The contents of original note 410 are not organized or formatted in any particular manner, and may have been typed quickly. Techniques described herein, such as the use of summary model 130 of FIG. 1 via the process described above with respect to FIG. 2 are used to generate formatted note 420 based on original note 410. Formatted note 420, which is displayed on a screen of a mobile device 450, comprises a version of original note 410 that has been reformatted based on topic. In particular, contents of original note 410 have been organized under automatically generated topic headers ("CREDITS," "CRYPTOCURRENCY," and "DEPENDENT") corresponding to topics that were extracted from original note 410. Content that is displayed beneath each given topic header comprises portions of original note 410 that were determined to relate to the given topic based on analysis performed using the summary model.

The topics displayed in formatted note 420 are included as examples, and many other topics are possible. In some embodiments, hierarchical topics are identified in which higher-level topics include lower-level topics within them. For example, two hierarchical topics "DEDUCTIONS—STUDENT LOAN INTEREST" and "DEDUCTIONS—MORTGAGE INTEREST," which share a higher-level topic while differing at a lower hierarchical level, may be organized next to one another in a formatted document.

A portion of a document that is determined to relate to multiple topics may, in some embodiments, be displayed beneath headers corresponding to each of the multiple topics (e.g., that portion of the document may be repeated multiple times in the formatted document). Furthermore, portions of the document that are not determined to relate to any topic may be excluded from the formatted version of the document (or, in some embodiments, may be included under a header indicating that the content is not relevant to any topic, such as at the end of the formatted document).

Figure 5:
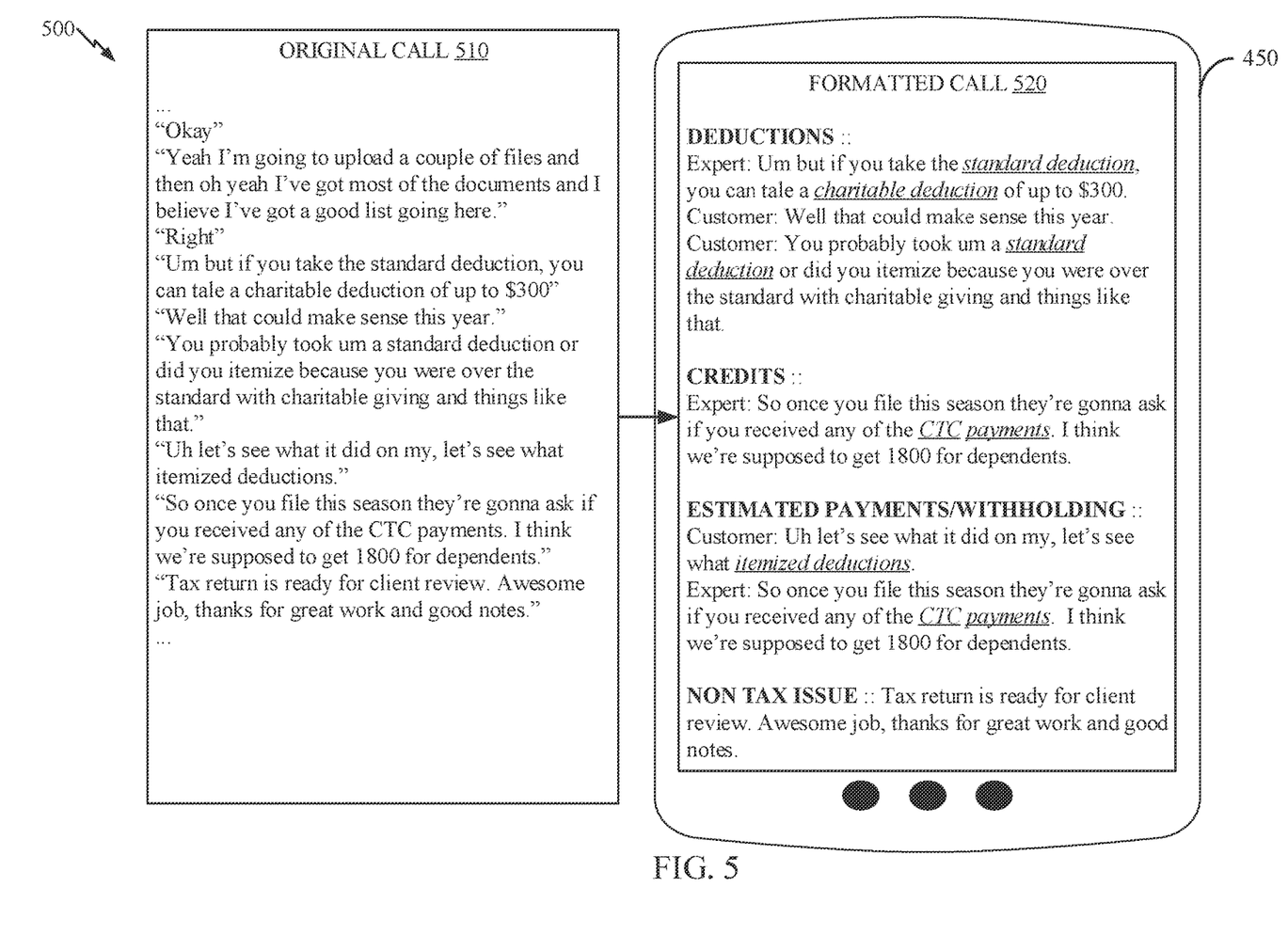
FIG. 5 depicts another example of automatic reformatting of an electronic document for optimized display within a software application.

FIG. 5 is another illustration 500 of automatic reformatting of an electronic document for optimized display within a software application. For example, illustration 500 may relate to generating a formatted call 353 based on a call 310 of FIG. 3.

Original note 510 comprises an unstructured document comprising a transcript of a call between an expert and a user of a software application. The contents of original call 510 are not organized or formatted in any particular manner, and may have been generated using speech-to-text technology. Techniques described herein, such as the use of highlighter model 140 of FIG. 1 via the process described above with respect to FIG. 3 are used to generate formatted call 520 based on original call 510. Formatted call 520, which is displayed on the screen of mobile device 450, comprises a version of original call 510 that has been reformatted based on topic and keywords. In particular, contents of original call 510 have been organized under automatically generated topic headers ("DEDUCTIONS," "CREDITS," "ESTIMATED PAYMENTS/WITHHOLDING," and "NON TAX ISSUE") corresponding to topics that were identified in portions (e.g., utterances) of original call 510. For example, topics may have been extracted from a note related to original call 510 using a summary model, and vectors representing keywords related to the extracted topics may have been compared to vectors representing words in original call 510 as part of processing performed by a highlighter model. Content that is displayed beneath each given topic header comprises portions of original call 510 that were determined to relate to the given topic based on analysis performed using the highlighter model. Words and phrases that are determined to be similar to keywords related to a given topic are highlighted or emphasized (e.g., through underlining and italics) in the portions of the call transcript displayed below a header corresponding to the given topic.

Portions of the document that are not determined to relate to any topic may be excluded from the formatted version of the document (or, in some embodiments, may be included under a header indicating that the content is not relevant to any topic, such as at the end of the formatted document). For example, original call 510 begins with a dialog about uploading files that is not determined to contain any relevant topic, and so this portion of original call 510 is excluded from formatted call 520.

Example Operations for Automated Parsing and Display of Electronic Documents

Figure 6:
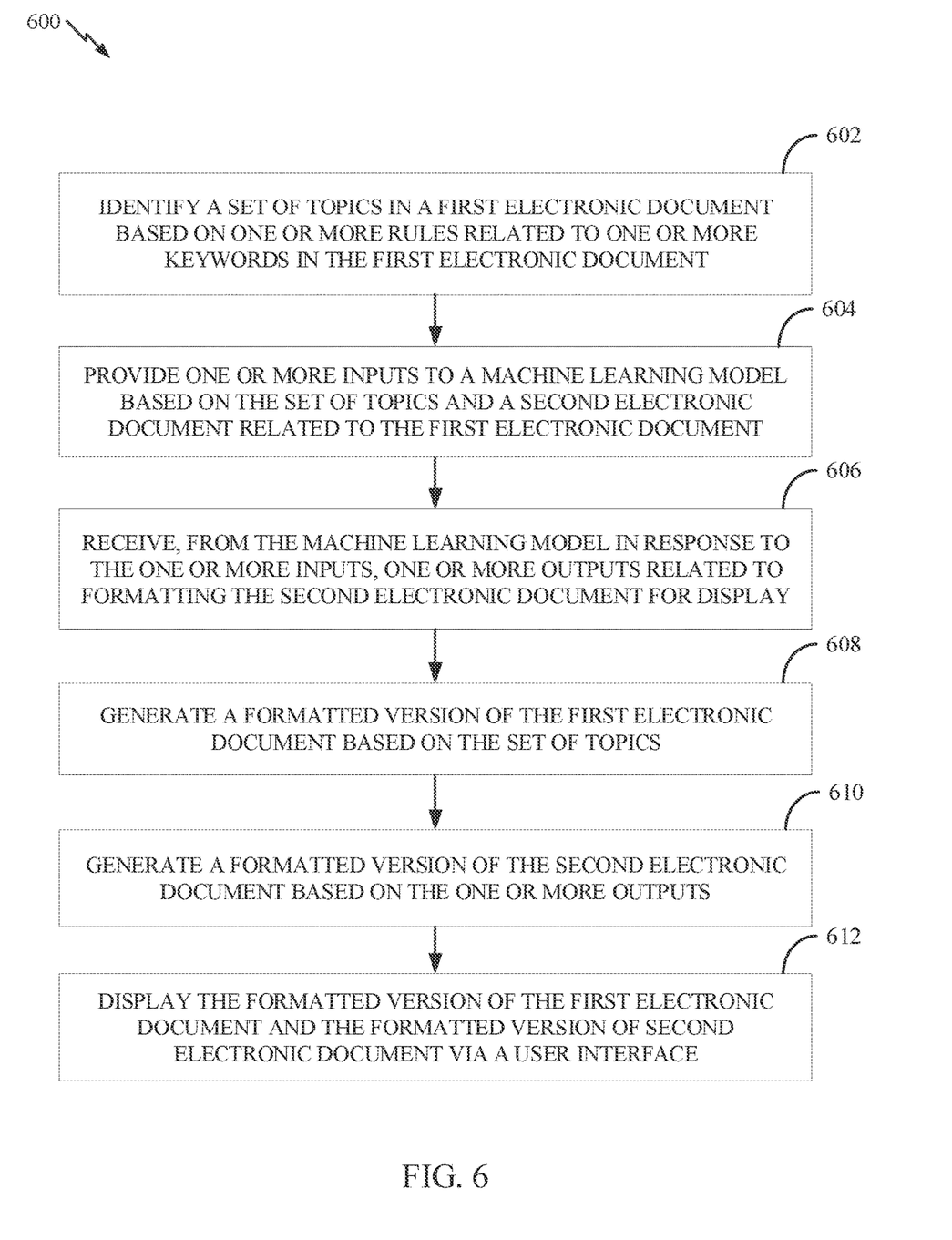
FIG. 6 depicts example operations for automated parsing and display of electronic documents.

FIG. 6 depicts example operations 600 for automated parsing and display of electronic documents. For example, operations 600 may be performed by a document processing engine, such as document processing engine 714 of FIG. 7.

Operations 600 begin at step 602, with identifying a set of topics in a first electronic document based on one or more rules related to one or more keywords in the first electronic document. For example, the topics may include one or more hierarchical topics.

In some embodiments, identifying the set of topics in the first electronic document based on the one or more rules related to the one or more keywords in the first electronic document comprises determining that the set of topics comprises more than one topic, segmenting the first electronic document into a plurality of segments, and determining a respective subset of the set of topics that corresponds to each respective segment of the plurality of segments based on the one or more rules.

In certain embodiments, the one or more rules relate to a domain-specific topic dictionary associated with a domain of the first electronic document.

Operations 600 continue at step 604, with providing one or more inputs to a machine learning model based on the set of topics and a second electronic document related to the first electronic document.

In some embodiments, the machine learning model compares vector representations of one or more strings in the second electronic document to respective vector representations associated with the set of topics.

Operations 600 continue at step 606, with receiving, from the machine learning model in response to the one or more inputs, one or more outputs related to formatting the second electronic document for display.

Operations 600 continue at step 608, with generating a formatted version of the first electronic document based on the set of topics.

In some embodiments, generating the formatted version of the first electronic document is further based on the respective subset of the set of topics that corresponds to each respective segment of the plurality of segments. In certain embodiments, generating the formatted version of the first electronic document comprises arranging contents of the first electronic document according to the set of topics Operations 600 continue at step 610, with generating a formatted version of the second electronic document based on the one or more outputs.

In some embodiments, generating the formatted version of the second electronic document based on the one or more outputs comprises highlighting or emphasizing one or more words in the second electronic document based on the one or more outputs.

Operations 600 continue at step 612, with displaying the formatted version of the first electronic document and the formatted version of second electronic document via a user interface.

Notably, method 600 is just one example with a selection of example steps, but additional methods with more, fewer, and/or different steps are possible based on the disclosure herein.

Example Computing System

Figure 7:
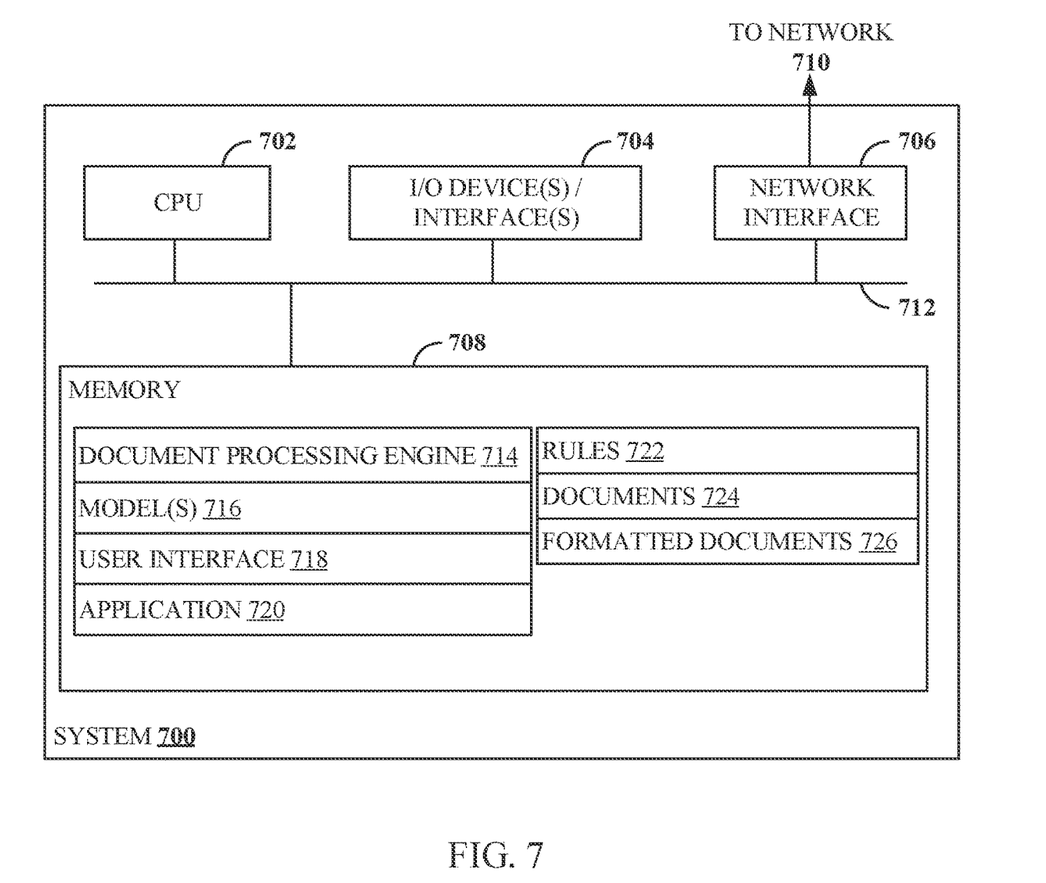
FIG. 7 depicts an example processing system for automated parsing and display of electronic documents.

FIG. 7 illustrates an example system 700 with which embodiments of the present disclosure may be implemented. For example, system 700 may be configured to perform operations 600 of FIG. 6.

System 700 includes a central processing unit (CPU) 702, one or more I/O device interfaces 704 that may allow for the connection of various I/O devices 714 (e.g., keyboards, displays, mouse devices, pen input, etc.) to the system 700, network interface 706, a memory 708, and an interconnect 712. It is contemplated that one or more components of system 700 may be located remotely and accessed via a network 710. It is further contemplated that one or more components of system 700 may comprise physical components or virtualized components.

CPU 702 may retrieve and execute programming instructions stored in the memory 708. Similarly, the CPU 702 may retrieve and store application data residing in the memory 708. The interconnect 712 transmits programming instructions and application data, among the CPU 702, I/O device interface 704, network interface 706, and memory 708. CPU 702 is included to be representative of a single CPU, multiple CPUs, a single CPU having multiple processing cores, and other arrangements.

Additionally, the memory 708 is included to be representative of a random access memory or the like. In some embodiments, memory 708 may comprise a disk drive, solid state drive, or a collection of storage devices distributed across multiple storage systems. Although shown as a single unit, the memory 708 may be a combination of fixed and/or removable storage devices, such as fixed disc drives, removable memory cards or optical storage, network attached storage (NAS), or a storage area-network (SAN).

As shown, memory 708 includes document processing engine 714, which may perform operations described herein related to improved automated parsing and display of electronic documents, such as operations 600 of FIG. 6. Memory 708 further includes one or more models 716, which may include summary model 130 and highlighter model 140 of FIG. 1 and/or one or more embedding models used to generate vector representations of text, such as at pre-processing 320 of FIG. 3. Memory 708 further includes user interface 718, which may represent a user interface via which formatted documents are displayed, such as on mobile device 450 of FIGS. 4 and 5. Memory 708 further includes application 720, which may be representative of a software application associated with documents that are processed and formatted according to embodiments of the present disclosure. In an example, embodiments of the present disclosure are used to generate formatted versions of multi-channel communication records associated with use of application 720 to perform one or more tasks, such as tax preparation.

Memory 708 further comprises rules 722, which may correspond to rules 132 of FIG. 1, documents 724, which may include all of the documents in multi-channel communication records 110 of FIG. 1, notes 210 of FIG. 2, calls/chats 310 of FIG. 3, original note 410 of FIG. 4, and original call 510 of FIG. 5. Memory 708 further comprises formatted documents 726, which may include formatted notes 136 and formatted calls/chats 142 of FIG. 1, formatted notes 253 of FIG. 2, formatted calls/chats 353 of FIG. 3, formatted note 420 of FIG. 1, and formatted call 520 of FIG. 5.

Example Clauses

Clause 1: A method for improved automated parsing and display of electronic documents, comprising: identifying a set of topics in a first electronic document based on one or more rules related to one or more keywords in the first electronic document; providing one or more inputs to a machine learning model based on the set of topics and a second electronic document related to the first electronic document; receiving, from the machine learning model in response to the one or more inputs, one or more outputs related to formatting the second electronic document for display; generating a formatted version of the first electronic document based on the set of topics; generating a formatted version of the second electronic document based on the one or more outputs; and displaying the formatted version of the first electronic document and the formatted version of second electronic document via a user interface.

Clause 2: The method of Clause 1, wherein identifying the set of topics in the first electronic document based on the one or more rules related to the one or more keywords in the first electronic document comprises: determining that the set of topics comprises more than one topic; segmenting the first electronic document into a plurality of segments; and determining a respective subset of the set of topics that corresponds to each respective segment of the plurality of segments based on the one or more rules.

Clause 3: The method of Clause 2, wherein generating the formatted version of the first electronic document is further based on the respective subset of the set of topics that corresponds to each respective segment of the plurality of segments.

Clause 4: The method of any one of Clause 1-3, wherein generating the formatted version of the first electronic document comprises arranging contents of the first electronic document according to the set of topics.

Clause 5: The method of any one of Clause 1-4, wherein the machine learning model compares vector representations of one or more strings in the second electronic document to respective vector representations associated with the set of topics.

Clause 6: The method of any one of Clause 1-5, wherein generating the formatted version of the second electronic document based on the one or more outputs comprises highlighting or emphasizing one or more words in the second electronic document based on the one or more outputs.

Clause 7: The method of any one of Clause 1-6, wherein the one or more rules relate to a domain-specific topic dictionary associated with a domain of the first electronic document.

Clause 8: The method of any one of Clause 1-7, wherein generating the formatted version of the second electronic document based on the one or more outputs comprises excluding one or more portions of the second electronic document from the formatted version of the second electronic document based on the one or more outputs.

Clause 9: A method for improved automated parsing and display of electronic documents, comprising: identifying a plurality of hierarchical topics in a first plurality of electronic documents based on one or more rules related to one or more keywords in the first plurality of electronic documents; providing one or more inputs to a machine learning model based on the plurality of hierarchical topics and a second electronic document related to the first plurality of electronic documents; receiving, from the machine learning model in response to the one or more inputs, one or more outputs related to formatting the second electronic document for display; generating formatted versions of the first plurality of electronic documents based on the plurality of hierarchical topics; generating a formatted version of the second electronic document based on the one or more outputs; and displaying the formatted versions of the first plurality of electronic documents and the formatted version of second electronic document via a user interface.

Clause 10: The method of Clause 9, wherein identifying the set of hierarchical topics in the first plurality of electronic documents based on the one or more rules related to the one or more keywords in the first electronic document comprises: determining that the set of hierarchical topics comprises more than one hierarchical topic for a given electronic document of the first plurality of electronic documents; segmenting the given electronic document into a plurality of segments; and determining a respective subset of the set of topics that corresponds to each respective segment of the plurality of segments based on the one or more rules.

Clause 11: The method of Clause 10, wherein generating the formatted versions of the first plurality of electronic documents is further based on the respective subset of the set of hierarchical topics that corresponds to each respective segment of the plurality of segments.

Clause 12: The method of any one of Clause 9-11, wherein generating the formatted versions of the first plurality of electronic documents comprises arranging contents of the first plurality of electronic documents according to the set of hierarchical topics.

Clause 13: The method of any one of Clause 9-12, wherein the machine learning model compares vector representations of one or more strings in the second electronic document to respective vector representations associated with the set of hierarchical topics.

Clause 14: The method of any one of Clause 9-13, wherein generating the formatted version of the second electronic document based on the one or more outputs comprises highlighting or emphasizing one or more words in the second electronic document based on the one or more outputs.

Clause 15: The method of any one of Clause 9-14, wherein the one or more rules relate to a domain-specific topic dictionary associated with a domain of the first electronic document.

Clause 16: The method of any one of Clause 9-15, wherein generating the formatted version of the second electronic document based on the one or more outputs comprises excluding one or more portions of the second electronic document from the formatted version of the second electronic document based on the one or more outputs.

Clause 17: A system, comprising: one or more processors; and a memory comprising instructions that, when executed by the one or more processors, cause the system to: identify a set of topics in a first electronic document based on one or more rules related to one or more keywords in the first electronic document; provide one or more inputs to a machine learning model based on the set of topics and a second electronic document related to the first electronic document; receive, from the machine learning model in response to the one or more inputs, one or more outputs related to formatting the second electronic document for display; generate a formatted version of the first electronic document based on the set of topics; generate a formatted version of the second electronic document based on the one or more outputs; and display the formatted version of the first electronic document and the formatted version of second electronic document via a user interface.

Clause 18: The system of Clause 17, wherein identifying the set of topics in the first electronic document based on the one or more rules related to the one or more keywords in the first electronic document comprises:

determining that the set of topics comprises more than one topic; segmenting the first electronic document into a plurality of segments; and determining a respective subset of the set of topics that corresponds to each respective segment of the plurality of segments based on the one or more rules.

Clause 19: The system of Clause 18, wherein generating the formatted version of the first electronic document is further based on the respective subset of the set of topics that corresponds to each respective segment of the plurality of segments.

Clause 20: The system of any one of Clause 17-19, wherein generating the formatted version of the first electronic document comprises arranging contents of the first electronic document according to the set of topics.

Additional Considerations

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for improved automated parsing and display of electronic documents, comprising:
    determining, for a first electronic document, based on a type of the first electronic document, to use a rules-based model and not a machine learning model for formatting the first electronic document, wherein:
        the rules-based model comprises one or more rules related to one or more keywords in the first electronic document, and
        the machine learning model is configured to analyze vectors representing text in a document and respective vectors representing keywords associated with topics;
    identifying a set of topics in the first electronic document using the rules-based model;
    determining, for a second electronic document, based on a respective type of the second electronic document, to use a technique involving the machine learning model for formatting the second electronic document;
    providing one or more inputs to the machine learning model based on the second electronic document;
    receiving, from the machine learning model in response to the one or more inputs, one or more outputs related to formatting the second electronic document for display;
    generating a formatted version of the first electronic document based on the set of topics;
    generating a formatted version of the second electronic document based on the one or more outputs; and
    displaying the formatted version of the first electronic document and the formatted version of second electronic document via a user interface.

2. The method of claim 1, wherein identifying the set of topics in the first electronic document based on the one or more rules related to the one or more keywords in the first electronic document comprises:
    determining that the set of topics comprises more than one topic;
    segmenting the first electronic document into a plurality of segments; and
    determining a respective subset of the set of topics that corresponds to each respective segment of the plurality of segments based on the one or more rules.

3. The method of claim 2, wherein generating the formatted version of the first electronic document is further based on the respective subset of the set of topics that corresponds to each respective segment of the plurality of segments.

4. The method of claim 1, wherein generating the formatted version of the first electronic document comprises arranging contents of the first electronic document according to the set of topics.

5. The method of claim 1, wherein the machine learning model compares vector representations of one or more strings in the second electronic document to respective vector representations associated with the set of topics.

6. The method of claim 1, wherein generating the formatted version of the second electronic document based on the one or more outputs comprises highlighting or emphasizing one or more words in the second electronic document based on the one or more outputs.

7. The method of claim 1, wherein the one or more rules relate to a domain-specific topic dictionary associated with a domain of the first electronic document.

8. The method of claim 1, wherein generating the formatted version of the second electronic document based on the one or more outputs comprises excluding one or more portions of the second electronic document from the formatted version of the second electronic document based on the one or more outputs.

9. The method of claim 1, wherein the machine learning model compares vector representations of one or more strings in the second electronic document to respective vector representations associated with the set of hierarchical topics.

10. The method of claim 1, wherein generating the formatted version of the second electronic document based on the one or more outputs comprises highlighting or emphasizing one or more words in the second electronic document based on the one or more outputs.

11. The method of claim 1, wherein the one or more rules relate to a domain-specific topic dictionary associated with a domain of the first electronic document.

12. The method of claim 1, wherein generating the formatted version of the second electronic document based on the one or more outputs comprises excluding one or more portions of the second electronic document from the formatted version of the second electronic document based on the one or more outputs.

13. A method for improved automated parsing and display of electronic documents, comprising:
   determining, for a first plurality of electronic documents, based on a type of the first plurality of electronic documents, to use a rules-based model and not a machine learning model for formatting the first plurality of electronic documents, wherein:
      the rules-based model comprises one or more rules related to one or more keywords in the first plurality of electronic documents, and
      the machine learning model is configured to analyze vectors representing text in a document and respective vectors representing keywords associated with topics;
   identifying a set of hierarchical topics in the first plurality of electronic documents using the rules-based model;
   determining, for a second electronic document, based on a respective type of the second electronic document, to use a technique involving the machine learning model for formatting the second electronic document;
   providing one or more inputs to the machine learning model based on the second electronic document;
   receiving, from the machine learning model in response to the one or more inputs, one or more outputs related to formatting the second electronic document for display;
   generating formatted versions of the first plurality of electronic documents based on the set of hierarchical topics;
   generating a formatted version of the second electronic document based on the one or more outputs; and
   displaying the formatted versions of the first plurality of electronic documents and the formatted version of second electronic document via a user interface.

14. The method of claim 13, wherein identifying the set of hierarchical topics in the first plurality of electronic documents based on the one or more rules related to the one or more keywords in the first plurality of electronic documents comprises:
   determining that the set of hierarchical topics comprises more than one hierarchical topic for a given electronic document of the first plurality of electronic documents;
   segmenting the given electronic document into a plurality of segments; and
   determining a respective subset of the set of topics that corresponds to each respective segment of the plurality of segments based on the one or more rules.

15. The method of claim 14, wherein generating the formatted versions of the first plurality of electronic documents is further based on the respective subset of the set of hierarchical topics that corresponds to each respective segment of the plurality of segments.

16. The method of claim 13, wherein generating the formatted versions of the first plurality of electronic documents comprises arranging contents of the first plurality of electronic documents according to the set of hierarchical topics.

17. A system, comprising:
   one or more processors; and
   a memory comprising instructions that, when executed by the one or more processors, cause the system to:
      determine, for a first electronic document, based on a type of the first electronic document, to use a rules-based model and not a machine learning model for formatting the first electronic document, wherein:
         the rules-based model comprises one or more rules related to one or more keywords in the first electronic document, and
         the machine learning model is configured to analyze vectors representing text in a document and respective vectors representing keywords associated with topics;
      identify a set of topics in a first electronic document using the rules-based model;
      determine, for a second electronic document, based on a respective type of the second electronic document, to use a technique involving the machine learning model for formatting the second electronic document;
      provide one or more inputs to the machine learning model based on the second electronic document;
      receive, from the machine learning model in response to the one or more inputs, one or more outputs related to formatting the second electronic document for display;
      generate a formatted version of the first electronic document based on the set of topics;
      generate a formatted version of the second electronic document based on the one or more outputs; and
      display the formatted version of the first electronic document and the formatted version of second electronic document via a user interface.

18. The system of claim 17, wherein identifying the set of topics in the first electronic document based on the one or more rules related to the one or more keywords in the first electronic document comprises:
   determining that the set of topics comprises more than one topic;
   segmenting the first electronic document into a plurality of segments; and
   determining a respective subset of the set of topics that corresponds to each respective segment of the plurality of segments based on the one or more rules.

19. The system of claim 18, wherein generating the formatted version of the first electronic document is further based on the respective subset of the set of topics that corresponds to each respective segment of the plurality of segments.

20. The system of claim 17, wherein generating the formatted version of the first electronic document comprises arranging contents of the first electronic document according to the set of topics.

* * * * *